United States Patent [19]

Jedlicka

[11] 4,237,938
[45] Dec. 9, 1980

[54] ENERGY ABSORBING DEVICE FOR PIPELINES

[75] Inventor: Josef Jedlicka, Dietzenbach, Fed. Rep. of Germany

[73] Assignee: Kraftwerk Union Aktiengesellschaft, Mülheim, Fed. Rep. of Germany

[21] Appl. No.: 970,453

[22] Filed: Dec. 18, 1978

[30] Foreign Application Priority Data

Dec. 21, 1977 [DE] Fed. Rep. of Germany ....... 2757076

[51] Int. Cl.³ ............................................. F16L 3/12
[52] U.S. Cl. ................................... 138/107; 138/103; 138/106; 248/49; 267/136
[58] Field of Search ............... 138/103, 106, 107, 113, 138/178; 248/60, 74 B, 74 PB, 49; 267/136; 285/114; 165/69

[56] References Cited

U.S. PATENT DOCUMENTS

| 1,362,221 | 12/1920 | Blackmore | 248/49 |
| 3,848,639 | 11/1974 | Chen | 138/106 X |
| 3,965,938 | 6/1976 | Bauerle et al. | 138/107 |
| 3,987,991 | 10/1976 | Keever et al. | 138/106 X |
| 4,101,117 | 7/1978 | East et al. | 138/106 X |
| 4,101,118 | 7/1978 | Mottola et al. | 138/106 X |

FOREIGN PATENT DOCUMENTS

| 2325085 | 12/1974 | Fed. Rep. of Germany | 138/107 |
| 2551219 | 5/1977 | U.S.S.R. | 248/49 |
| 2556069 | 6/1977 | Fed. Rep. of Germany | 248/49 |
| 576484 | 11/1977 | U.S.S.R. | 138/107 |

*Primary Examiner*—James E. Bryant, III
*Attorney, Agent, or Firm*—Herbert L. Lerner

[57] ABSTRACT

Pipeline restraining device including a loop-shaped holding member surrounding a pipe of the pipeline and being of such dimensions as to be plastically deformed under the action of the force with which the pipe is held, which includes a further holding member disposed substantially parallel to the direction of application of the holding force and being longer than the plastically deformable holding member, the further holding member being of such dimension as to be elastically deformed under the action of the holding force.

6 Claims, 4 Drawing Figures

ENERGY ABSORBING DEVICE FOR PIPELINES

The invention relates to a restraining or energy absorbing device for pipelines having a holding member which surrounds a pipe of a line of pipes, especially in the form of a multilayer loop, and which is dimensioned for plastic deformation under the action of the holding force.

The plastic deformation is to absorb the energy of the line which is deflected due to a break, as is described, for example, in German Published Non-Prosecuted Application DE-OS Nos. 25 51 219 and 25 56 069. For this purpose, the loop can have a multilayer construction and, in fact, several layers can also be disposed adjacent one another i.e. distributed in direction of the longitudinal axis of the pipeline, as is shown, for example, in French Pat. No. 2 241 036.

It is an object of the invention to simplify the construction of such protective devices for pipe deflections or excursions. Such simplified construction is sought to be achieved by optimizing the absorption of the force through plastic deformation of the holding member. Simultaneously, the deflection or excursion of the pipeline is sought to be limited in a defined manner. In this connection, it should be noted, however, that such required conditions for effecting simplified construction of the device according to the invention are contradictory, since maximal energy dissipation due to plastic deformation presupposes the greatest possible elongation or expansion of the restraining device before it breaks which, of course, is the opposite of limiting the deflection or excursion.

With the foregoing and other objects in view, there is provided, a pipeline restraining device including a loop-shaped holding member surrounding a pipe of the pipeline and being of such dimension as to be plastically deformed under the action of the force with which the pipe is held, comprising a further holding member disposed substantially parallel to the direction of application of the holding force and being longer than the plastically deformable holding member, the further holding member being of such dimension as to be elastically deformed under the action of the holding force. Thus, the separation of the functions of the restraining device is produced. The plastically deformable holding member need be constructed only for dissipation of energy, and the other holding member which, though elastically deformable, is practically "rigid" in comparison to the plastically deformable holding member, serves to determine or define the deflection or excursion. It is therefore impossible for the restraining device to break, without causing the restraining device to become undesirably stiff and the introduction of excessively large forces into the structure supporting or carrying the pipeline.

In accordance with another feature of the invention, the plastically deformable material is primarily austenitic steel. For the elastically deformable holding member, on the other hand, a material having a loadability or load capacity considerably higher, preferably several times greater, is selected. According to the invention, such a material is preferably high-strength steel with a tensile strength δ P of more than 100 kg/mm².

The length difference between the elastically deformable and the plastically deformable holding member is optimized, in accordance with a further feature of the invention, wherein the elastically deformable and the plastically deformable holding members have s difference in length that is substantially equal to the plastic elongation of the plastically deformable holding member up to the uniform (proportional) elongation limit thereof. By uniform elongation limit there is understood to means the stress during the plastic deformation of a material, at which the curve of the tensile stress against the deformation displacement has reached a maximum and where, therefore, the tensile stress begins to reduce upon further deformation.

In accordance with an added feature of the invention, the elastically deformable holding member is also constructed as a loop. This means that both holding members surround the pipe of the pipeline over at least one-half of the circumference thereof. Within the scope and meaning of such a loop construction, the holding members can also be formed as a multi-layer band, which is disposed around holding pins, as shown, for example, in German Published Non-Prosecuted Application DE-OS No. 25 51 219.

In accordance with an additional feature of the invention, the restraining device includes a fixable holding structure to which both the elastically deformable and the plastically deformable holding members are attached in common. Such a holding structure may be, for example, a metal plate which is attachable to appropriate building structures.

In accordance with a concomitant feature of the invention, both the holding members are connected to one another at individual locations distributed over the length thereof. A result thereof is that the elastically deformable loop is brought into the holding or restraining position thereof during movement of the plastically deformable loop, so that a jerking motion can be avoided, which must otherwise occur during stressing of the elastic holding member. In any case, the loading on the building structure due to the pipe deflection protection device anchored therein can be reduced overall by at least a factor of 2.

Other features which are considered as characteristic for the invention are set forth in the appended claims.

Although the invention is illustrated and described herein as embodied in energy absorbing device for pipelines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of the specific embodiments when read in connection with the accompanying drawing in which.

Figure 1:
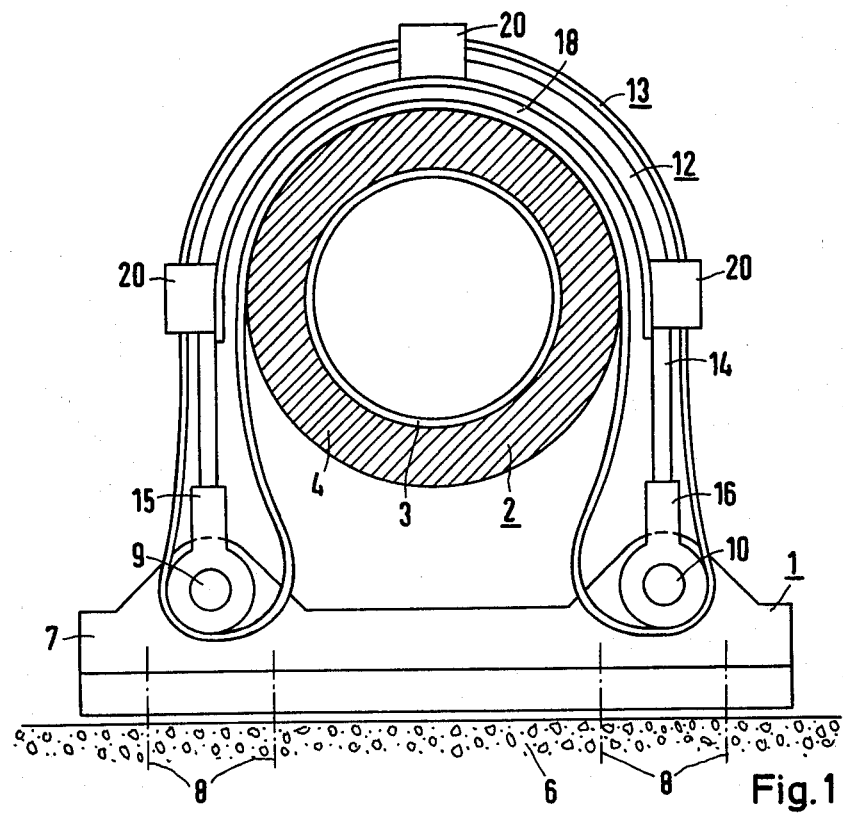
FIG. 1 is a cross-sectional view of a device for protecting against deflective thrust of a pipeline, in accordance with the invention, the view being in a plane perpendicular to the longitudinal axis of the pipeline.

Referring now to the drawing and first, particularly, to FIG. 1 thereof, there is shown a restraining device 1 belonging to a main or live steam line 2 in a boiling-water nuclear power plant, for example, for 1000 MWe. The pipeline includes a steel pipe 3 having a nominal diameter of 700 mm, which is surrounded by heat insulation 4. The holding force for intercepting the pipe 2 deriving from jet forces during rupture of the pipeline is about 350 tons.

To restrain or intercept the mentioned forces, the pipeline is anchored in a concrete wall 6. A holding plate 7 formed of steel is fastened to the wall 6 by bolts or screws 8 represented diagrammatically by the center lines thereof. The holding plate 7 carries two holding pins 9 and 10 which are inserted into suitable eyes formed in the holding plate 7. Two holding members 12 and 13 are fastened thereat.

The holding member 12 is plastically deformable. It is made up of round stock 14 of austenitic steel having a diameter, for example, of 100 mm. The round stock is held by the ends thereof in eyes 15 and 16 articulatingly mounted on the pins 9 and 10. This results in a loop surrounding the pipe 3 and having a length which is 3200 mm under operating conditions. A spacing or clearance 18 is provided between the holding member 12 and the pipeline 2. The pipeline can, therefore, expand freely in normal operation.

The plastically deformable holding member 13 is formed of continuously or endlessly wound single or multiple layers of high-strength strip steel ($\delta P = 130$ kp/mm$^2$). As is evident from FIG. 1 the length of the holding member 13 is considerably greater than that of the holding member 12. In the illustrated embodiment, the difference in the lengths of the holding members 12 and 13 is 1600 mm.

Figure 2:
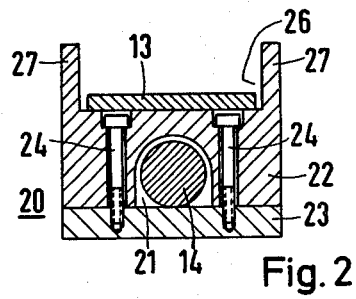
FIG. 2 is a fragmentary enlarged cross-sectional view of FIG. 1 showing the manner of connection of the two holding members of the device.

The holding members 12 and 13 are bolted or screwed together by connecting pieces 20 at three locations uniformly distributed over the length of the loops. One of the connection locations is shown in enlarged cross-sectional view in FIG. 2. The round stock 14 forming the holding member 12 is shown seated in a recess 21 formed in a metal member 22. The recess is closed off by a cover plate 23, which is applied against the metal member 22 with contact pressure by screws 24. On the side facing away from the recess 21, there is provided a cutout 26 defined by walls 27. A guide for the bands of the holding member 13 is thereby formed.

Figure 3:
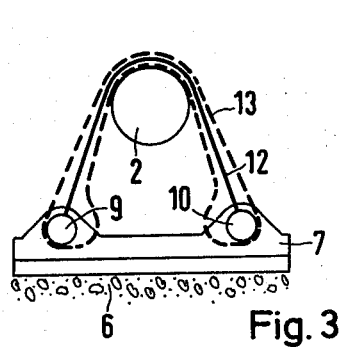
FIGS. 3 and 4 are simplified diagrammatic views of FIG. 1 in reduced scale showing different positions of the holding members, respectively, during normal operation and when a deflected pipeline is being restrained or intercepted thereby.

What is accomplished by the connecting pieces 20, is that the pipeline 2 which tends to pull away from the holding plate 7 in case of a break and deforms the holding member 12 shown in FIG. 3 as a solid line, simultaneously tightens the loop of the holding member 13, shown as a broken line. Pulsating or intermittent stressing of the pins 9 and 10 is, therefore, prevented if the maximal elongation of the holding member 12 is attained and the holding member 13 becomes effective.

Figure 4:
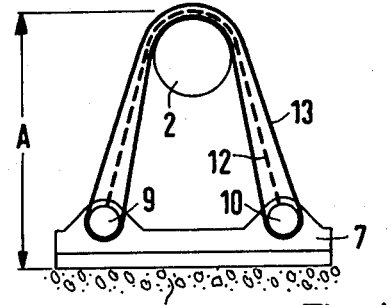

In the end position of the pipe restraining device, according to the invention, shown diagrammatically in FIG. 4, the entire stress is on the holding member 13, which is shown as a solid line. The holding member 12 is relieved of stress. Up to this point, the holding member 12 was plastically deformed up to the uniform elongation limit, so that the major part of the energy of the pipeline 2 was absorbed by plastic deformation. Nevertheless, an exactly defined limit position is obtained. The maximum excursion or deflection A of the pipeline 2 with respect to the holding plate 7 is therefore exactly determined because, with jet forces which cause a different movement i.e. not perpendicular to the wall 6, an even shorter deflection away from the wall 6 is produced.

The advantageous limitation of the excursion or deflection A is not bound or restricted to a requirement that two holding loops 12 and 13, as in the illustrated embodiment, be provided which are held by the same fastening means 9 and 10. On the contrary, it is necessary only that the "stiff" holding member 13 act parallel and opposite to the force which causes the excursion or deflection i.e. with the same direction of application or operation as the "soft" holding member.

There is claimed:

1. Pipeline restraining device including a loop-shaped holder surrounding a pipe of the pipeline and being of such dimension and material as to be plastically deformed under the action of the force with which the pipe is held, comprising a further holder disposed substantially parallel to the direction of application of the holding force and being longer than the plastically deformable holder and being independently moveable with respect thereto, said further holder being of such dimension and material as to be elastically deformed under the action of the holding force.

2. Restraining device according to claim 1 wherein said plastically deformable holder is formed of austenitic steel, and said elastically deformable holder is formed of high-strength steel having a tensile strength greater than 100 kg/mm$^2$.

3. Restraining device according to claim 1 wherein the elastically deformable and the plastically deformable holders have a difference in length that is substantially equal to the plastic elongation of the plastically deformable holder up to the uniform elongation limit thereof.

4. Restraining device according to claim 1 wherein said elastically deformable holder is also constructed as a loop.

5. Restraining device according to claim 1 including a fixable holding structure to which both said elastically deformable and plastically deformable holders are attached in common.

6. Restraining device according to claim 1 wherein both said elastically deformable and plastically deformable holders are connected to one another at individual locations distributed over the length thereof.

* * * * *